United States Patent [19]

McRae et al.

[11] 3,732,495

[45] May 8, 1973

[54] SIGNAL TRANSMISSION AND MODULATION TECHNIQUE THEREFOR

[75] Inventors: Daniel D. McRae, West Melbourne; Carmen J. Palermo, Melbourne Beach; Majella G. Pelchat, Indialantic, Fla.

[73] Assignee: Radiation, Inc., Melbourne, Fla.

[22] Filed: July 20, 1970

[21] Appl. No.: 56,527

[52] U.S. Cl. ....................325/60, 325/61, 340/167 R, 340/203

[51] Int. Cl. ....................H04b 1/00

[58] Field of Search ....................325/38 R, 38 A, 38 B, 325/39, 40, 43, 44, 60; 340/167, 169, 203, 204, 205, 186; 178/68, DIG. 3, 13; 179/15 AE, 15.55

[56] References Cited

UNITED STATES PATENTS

| | | | |
|---|---|---|---|
| 3,324,237 | 6/1967 | Cherry et al. | 178/DIG. 3 |
| 3,573,364 | 4/1971 | Shimamura | 325/38 B |
| 2,453,461 | 11/1948 | Schelleng | 325/43 |
| 2,516,587 | 7/1950 | Peterson | 179/15 AE |
| 3,163,718 | 12/1964 | Deman | 325/60 X |
| 3,378,641 | 4/1968 | Varsos et al. | 179/15.55 |
| 3,484,556 | 12/1969 | Flanagan et al. | 179/15.55 |

*Primary Examiner*—Benedict V. Safourek
*Attorney*—Donald R. Greene

[57] ABSTRACT

Two separate signals are derived as indicative of the information content of each of a plurality of discrete time samples of an input waveform. One of these signals effectively constitutes a stretching of the respective sample, and hence of the input waveform, by designating the deviation of the sample amplitude (or other selected parameter) from an unknown one of a set of discretely increasing reference levels greater in number than two, in a magnified format. The second signal designates the reference level with respect to which the deviation pertains, and thus resolves the ambiguity associated with the first signal. The first and second signals, or an appropriate combination thereof, are impressed on a carrier for transmission to a remote receiving station. Accompanying noise resulting from transmission is compressed in a ratio equal to the ratio of compression of the first signal at the receiving station, to reconstruct the original waveform.

12 Claims, 21 Drawing Figures

INVENTORS
DANIEL D. McRAE,
CARMEN J. PALERMO,
& MAJELLA G. PELCHAT
BY William J. Flynn
ATTORNEY INVENTORS
DANIEL D. McRAE,
CARMEN J. PALERMO,
& MAJELLA G. PELCHAT
BY
William J. Flynn
ATTORNEY INVENTORS
DANIEL D. McRAE,
CARMEN J. PALERMO,
& MAJELLA G. PELCHAT
BY
William J. Flynn
ATTORNEY INVENTORS
DANIEL D. McRAE,
CARMEN J. PALERMO,
& MAJELLA G. PELCHAT
BY
William J. Flynn
ATTORNEY INVENTORS
DANIEL D. MCRAE,
CARMEN J. PALERMO,
& MAJELLA G. PELCHAT
BY
William J. Flynn
ATTORNEY INVENTORS
DANIEL D. McRAE,
CARMEN J. PALERMO,
& MAJELLA G. PELCHAT
BY
William J. Flynn
ATTORNEY

SIGNAL TRANSMISSION AND MODULATION TECHNIQUE THEREFOR

This invention relates to the transmission of signal information so as to enable a selected variation of the signal-to-noise ratio without requiring a change in the bandwidth for signal transmission.

While the following detailed disclosure of the present invention is directed primarily to communication involving the use of radio frequency energy propagated through space or the earth's atmosphere or along one or more conductors, it is to be understood that its novel principles are applicable also to communication by light energy and to communication by compressional waves, such as in underwater acoustic signalling.

In the various well-known modulation techniques used in the transmission of signal information, such as frequency modulation, pulse code modulation, single sideband, and amplitude modulation, an increase in the signal-to-noise ratio can be achieved only at the expense of increased bandwidth or increased power. In many practical situations, the bandwidth or power available for signal transmission is so limited that the desired signal-to-noise ratio cannot be achieved conveniently by whatever conventional modulation technique is used.

The present invention overcomes this problem in a novel and advantageous manner which enables a relatively wide range of signal-to-noise ratios to be obtainable for a given signal transmission bandwidth, as well as providing generally improved transmission of signal information for a given bandwidth.

Accordingly, it is a principal object of this invention to provide a novel and improved modulation technique for use in the transmission of signal information.

Another object of this invention is to provide a novel and improved method of transmitting signal information which embodies a novel modulation technique capable of providing excellent signal-to-noise ratios for a given bandwidth.

Another object of this invention is to provide a novel and improved signalling system based on a novel modulation technique that enables a selection of the signal-to-noise ratio over a relatively wide range without requiring a change in the transmission bandwidth.

Another object of this invention is to provide a transmitter embodying the novel modulation technique of the present invention.

Another object of this invention is to provide a receiver adapted to recover the signal information transmitted in accordance with the novel modulation technique of the present invention.

Further objects and advantages of this invention will be apparent from the following detailed description of certain presently-preferred examples with reference to the accompanying drawings.

Figure 1:
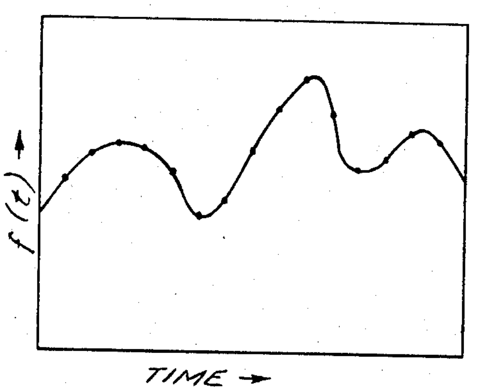
FIG. 1 illustrates a continuous wave signal to be transmitted and the points on this signal where it is sampled to provide signal representations from which the continuous wave signal may be reconstituted by interpolation.

Referring first to FIGS. 1–5, the signal to be transmitted is shown in FIG. 1 as a continuous function, $f(t)$, of time. For example, $f(t)$ may be the signal amplitude.

A suitable sampling of this continuous wave input signal is obtained by any desired arrangement for representing the signal in terms of a finite set of numbers over a finite time interval. For example, a known time division multiplex technique may be employed to sample the continuous wave signal at discrete time intervals, as indicated by the successive dots on the continuous wave signal in FIG. 1. However, any other form of signal sampling may be employed to obtain the discrete signal representations from which the continuous wave signal can be accurately reconstructed by known reconstruction techniques at a receiver.

Figure 4:
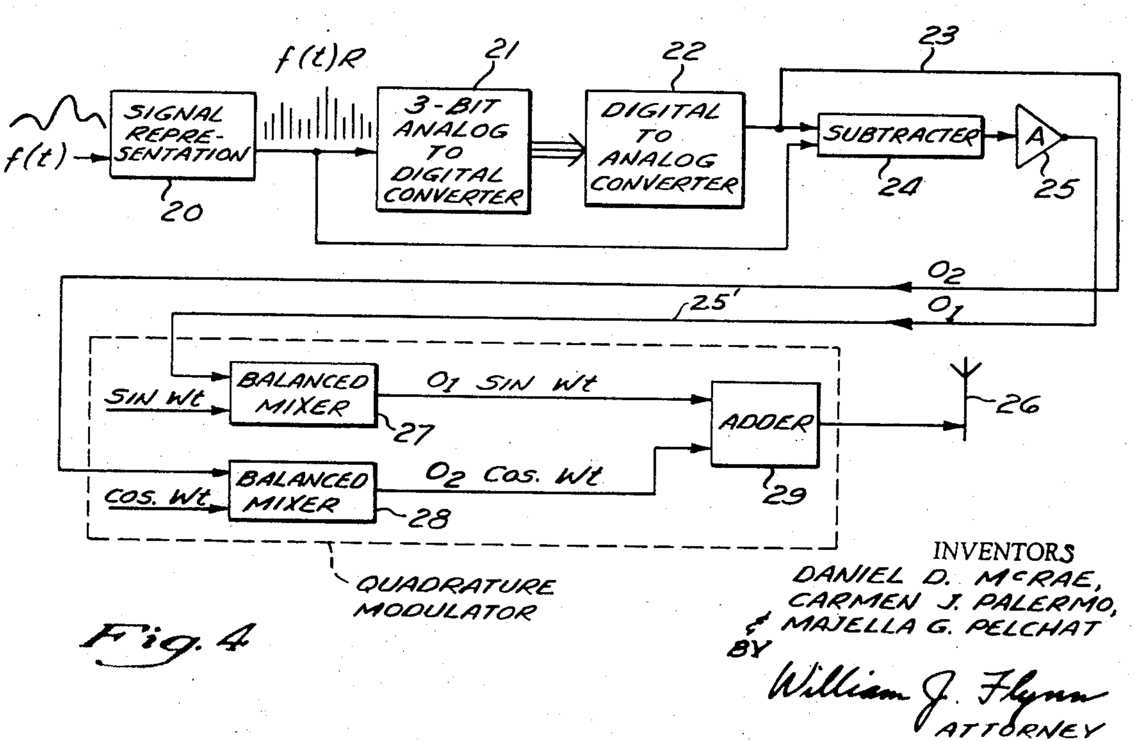
FIG. 4 is a schematic block diagram of a transmitter embodying the modulation technique mapped in FIGS. 2 and 3.

As shown in FIG. 4, the continuous wave signal $f(t)$ has been converted by the signal representation circuit 20 into a series of time-discrete pulses, $f(t)$ R, each representing the continuous wave signal amplitude at a particular point in time.

Figure 2:
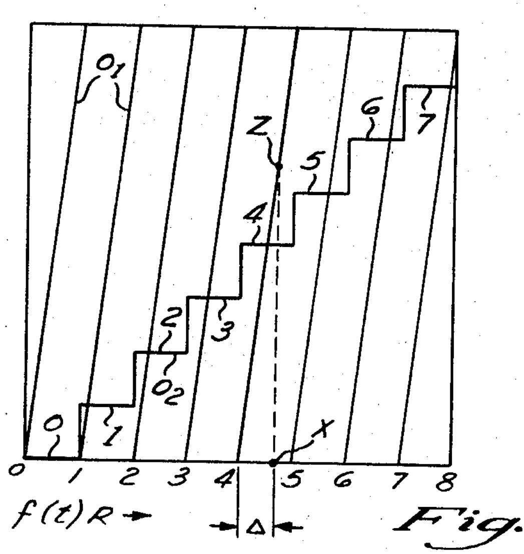
FIG. 2 is a plot of the functions of the signal representation which are provided by a quantizing operator, $0_2$, and a periodic operator, $0_1$, in accordance with one embodiment of the present invention.

In accordance with this embodiment of the present invention, it is desired to operate on the input signal representation, $f(t)R$, by two distinct operators $0_1$ and $0_2$, as shown graphically in FIG. 2.

Operator $0_2$ quantizes the signal input in accordance with known N-ary pulse modulation techniques to provide a stair-step function. That is, for the lowest range of values of $f(t)R$, operator $0_2$ has the value zero, for the next higher range of values of $f(t)R$, operator $0_2$ has the value 1, and so on.

Operator $0_1$ is a periodic function that increases in straight-line fashion from zero to a maximum over each range of $f(t)R$ which corresponds to a particular level of the stair-step function $0_2$. It will be apparent that any particular value of $0_1$ will be the same for several different values of $f(t)R$. That is, standing alone, $0_1$ is ambiguous because it is a multi-valued function of the input, $f(t)R$. This ambiguity is resolved by the quantizing operator $0_2$ which makes it possible to identify the single-valued branch of this multi-valued function, i.e., the particular $0_1$ line for a given range of f(t)R. The several lines $0_1$ provide "stretching" of the input signal values to enable a high signal-to-noise ratio for a given bandwidth.

Figure 3:
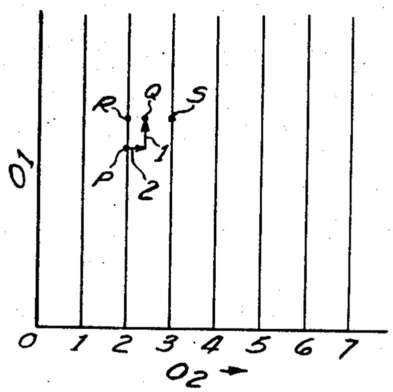
FIG. 3 is a plot of operator $0_1$ versus operator $0_2$ in FIG. 2.

FIG. 3 shows a plot of operator $0_1$ against operator $0_2$ in the modulation arrangement now under discussion. For any given value of $0_2$, $0_1$ may be from zero to a maximum.

The method of modulation provided by the circuitry of FIG. 4 is based on the principle that a number, $g$, may be expressed in modular fashion as follows:

$$g = Ka + R$$

where $K$ is an integer, $a$ is the modulus, and $R$ is the remainder term. In the modulation arrangement now under discussion, the $0_2$ signal is the $K$ term in the above equation, and the $0_1$ signal is the remainder term, $R$.

The signal representation pulses, $f(t)R$, in FIG. 4 are applied to an analog-to-digital converter 21 of known design, preferably having a register with a number of binary stages which are set in accordance with the instantaneous amplitude of the signal representation, $f(t)R$. For example, the A-to-D converter 21 may be a 3-bit converter having $2^3$ or 8 possible combinations of its three binary stages.

The output of the A-to-D converter 21 is connected to the input of a digital-to-analog converter 22, which preferably consists of a plurality of resistors which are weighted in accordance with the various binary combinations in converter 21. The output of D-to-A converter 22 is a current which may be at any one of eight different levels, so that it provides the quantizing, stairstep function $0_2$ in FIG. 2. That is, for the lowest amplitude range of the signal representation of $f(t)$, the output $0_2$ from converter 22 is at level zero in FIG. 2; for the next higher range of the signal representation amplitude, the output $0_2$ from converter 22 is at level 1 in FIG. 2; and so on.

This output $0_2$ from the D-to-A converter 22 is applied directly to line 23.

Also, the output $0_2$ from the D-to-A converter 22 is applied as one input to a subtraction circuit 24. A second input to this subtracter 24 is directly from the output of the signal representation circuit 20, so that it receives the input signal representation, $f(t)R$. The subtracter 24 subtracts these two signals, so that the signal output from the subtracter has the value $[f(t)R-0_2]$. This difference signal is represented graphically in FIG. 2 by the value Δ, where the arbitrarily chosen value of $f(t)R$ is shown at point X. This difference value, Δ, is proportional to the value Z of the operator $0_1$ for this particular value (X) of $f(t)R$. Z is obtained by multiplying Δ by the slope of the $0_1$ line or (what is the same thing) by the number of different $0_1$ lines in FIG. 2. This multiple is $2^3$ (or 8), the same as the number of stair-steps provided by the quantizing operator $0_2$.

This multiplication of Δ, or $[f(t)R-0_2]$, to get $0_1$ is obtained by passing the output signal Δ from the subtracter 24 through an amplifier 25 having an amplication factor of 8 in this instance (corresponding to the number of stair-steps provided by the quantizing operator $0_2$).

The respective output signals $0_2$ and $0_1$ on lines 23 and 25' are applied to a suitable modulator before being broadcast by antenna 26. While any suitable modulator may be used, the presently-preferred arrangement is a phase quadrature modulator in order to minimize the bandwidth requirements. Signal $0_1$ is applied to a balanced mixer 27 to amplitude modulate a sin wt carrier. Signal $0_2$ is applied to a balanced mixer 28 to amplitude modulate a cos wt carrier. The respective [$0_1$ sin wt] and [$0_2$ cos wt] signals are added in an adder 29 before being broadcast by the antenna 26.

Figure 5:
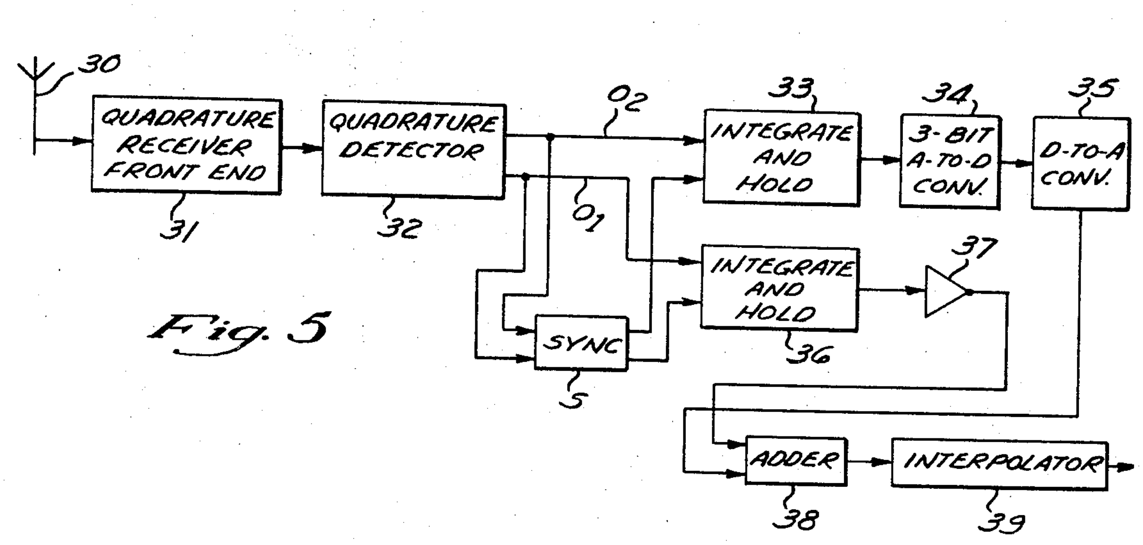
FIG. 5 is a schematic block diagram of a receiver for recovering the original signal from the signal information transmitted by the FIG. 4 transmitter.

The signal transmitted by the antenna 26 in FIG. 4 is received by the receiver antenna 30 in FIG. 5 and is passed through a conventional quadrature receiver front end circuit 31 and a quadrature detector 32 to recover the respective operator signals $0_1$ and $0_2$.

The quantized operator pulse $0_2$ is applied to an integrate-and-hold circuit 33, under the control of a synchronizer S, to filter out noise. The $0_2$ signal then is applied to a 3-bit analog-to-digital converter 34 and from there through a digital-to-analog converter 35 to provide signal quantization.

The operator pulse $0_1$ is applied to an integrate-and-hold circuit 36, under the control of synchronizer S, to filter out noise and then is attenuated by attenuator 37 to recover the Δ signal value. In the embodiment under discussion the amplitude of the input signal to attenuator 37 is reduced by a factor of 8 to 1, which corresponds to the ratio between $0_1$ and Δ.

The outputs of the D-to-A converter 35 and the attenuator 37 are added together in an adder 38. The output from the adder is a replica of the input signal representation, $f(t)R$. This signal is applied to a known interpolator circuit 39, which converts the input signal representation, F(t)R, into a substantial replica of the original continuous wave input signal, $f(t)$.

The manner in which the modulation technique which is mapped in FIGS. 2 and 3 improves the signal-to-noise ratio may be visualized with reference to FIG. 3. Assume that the signal representation input to the FIG. 4 transmitter is designated by the point P in FIG. 3. However, the receiver (FIG. 5) may actually receive a signal designated by the point Q in FIG. 3 because of the addition of a noise phasor 2 to the $0_2$ value of signal P and the addition of a noise phasor 1 to the $0_1$ value of signal P.

The receiver of FIG. 5 is designed to operate upon the principle that when the received value of $0_2$ is between two integers, it is changed to the closer of these integers. Consequently, as shown in FIG. 3, the receiver converts the received signal Q to a signal R. In doing so, the receiver has completely eliminated noise due to the noise phasor 2. The remaining difference between the signal R and the original signal P represents noise error, and in this case this noise error is equal to the noise phasor 1. However, this noise error then is attenuated in the attenuator 37 in the FIG. 5 to $1/n$th of its magnitude shown in FIG. 3 (where $n$ is the number of map lines in FIG. 3) before the replica of the input signal representation is produced by the adder 38.

Thus, it will be apparent that noise accompanying the transmitted signal representation is reduced by a factor substantially equal to the signal "stretching" (i.e., the number of map lines in FIG. 3), achieved by having the operator, $0_1$, which provides the remainder term, as a periodic function of the input signal representation, $f(t)R$. Stated another way, because the input signal representation, $f(t)R$, is multi-valued with respect of the remainder term, $0_1$, the effects of noise are reduced approximately in accordance with the multiple of that relationship.

An inherent limitation on the signal "stretching" technique involved in the present invention is that as more map lines are provided (i.e., as signal "-stretching" is increased), the greater likelihood there will be of a quantizing error. For example, in FIG. 3 the magnitude of the noise with respect to the spacing between adjacent map lines may be such that the received signal, Q, will be closer to the next higher quantizing term (3) than to the correct quantizing term (2) for the original signal representation, P. In that case, the receiver will convert the receiver signal, Q, to signal S, which will have a noise error equivalent to a quantized value of 1. This would produce a large, abrupt burst of noise at the receiver. It is equivalent to the well-known threshold effect in frequency modulation transmission. This problem is more serious as the noise becomes larger.

In accordance with the present invention, it is possible to provide a compromise between the signal-to-noise ratio and this threshold effect without changing the bandwidth required for transmission and without requiring exorbitant power.

Thus, the greater the signal "stretching" provided by the operator, $0_1$, that provides the remainder term, the higher will be the signal-to-noise ratio, but the greater will be the possibility of the threshold effect. Conversely, a smaller signal "stretching" will provide a lower signal-to-noise ratio, along with a corresponding reduction of the threshold effect.

For example, in the modulator and transmitter arrangement of FIG. 4, the bandwidth requirements are determined by the number of different operators, in this case, two. Accordingly, for every input signal representation pulse there will be two pulses transmitted (i.e., the $0_1$ pulse and the $0_2$ pulse). This condition is not changed when the number of map lines, or different quantizing levels $0_2$, is increased or decreased. Therefore, the bandwidth would not change if the number of map lines is increased, so as to increase the signal-to-noise ratio and make the noise threshold problem more serious. Nor would the bandwidth change if the number of map lines is reduced, so as to decrease the signal-to-noise ratio and reduce the seriousness of the threshold effect.

Accordingly, with the present invention the user can select the number of map lines (according to the different quantizing levels provided by operator $0_2$) in accordance with the expected noise level, so as to trade off between signal-to-noise ratio and threshold effect, but without affecting the bandwidth required for transmission. That is, the performance characteristics may be tailored in accordance with the expected noise problems without any change in the transmission bandwidth.

This flexibility inherent in the present modulation technique is not possible in F. M. transmission, where bandwidth is the only variable that can be changed in order to change the signal-to-noise ratio, and substantially improved signal-to-noise ratio can be achieved only by an exorbitant increase in bandwidth. Essentially, the same limitation is inherent in binary pulse code modulation transmission where the signal to noise ratio can be improved only by increasing the number of bits per message.

In single sideband transmission, a substantial increase in the signal-to-noise ratio can be accomplished only by increasing the power to an exorbitant extent.

In the present invention, a signal to noise ratio is possible that is comparable to the best available with FM or PCM systems, but without the bandwidth requirements of FM or PCM and without requiring excessive power, as in the case of single sideband systems.

Referring again to FIG. 4, various analog-to-digital converters, particularly those of the "half-split coder" type, are so designed that they can provide both the $0_2$ output signal and the Δ signal. Consequently, by applying these outputs as shown in FIG. 4, the $0_1$ and $0_2$ pulses may be obtained. Half-split coders make the quantizing decisions sequentially, and each time such a decision is made the difference signal is retained in order to make the next quantizing decision. Therefore, in the case of a 3-bit coder, after the third and least significant binary decision is made, the difference or remainder between the number $0_2$ registered by the 3 bits in the coder and the actual input signal value $f(t)R$ is retained in the coder. Therefore, when such a coder is used as the analog-to-digital converter 21 in FIG. 4, this retained number corresponds to Δ and may be applied directly to the amplifier 25. The 3-bit number stored in the coder is applied to the digital-to-analog converter 22, which may be a network of resistors contained within the coder, to provide the other input, $0_2$, to the subtracter 24. Thus, in such an embodiment, the A-to-D converter 21 and the D-to-A converter 22 may both be embodied in the same half-split coder, which also includes the subtracter 24.

Figure 6:
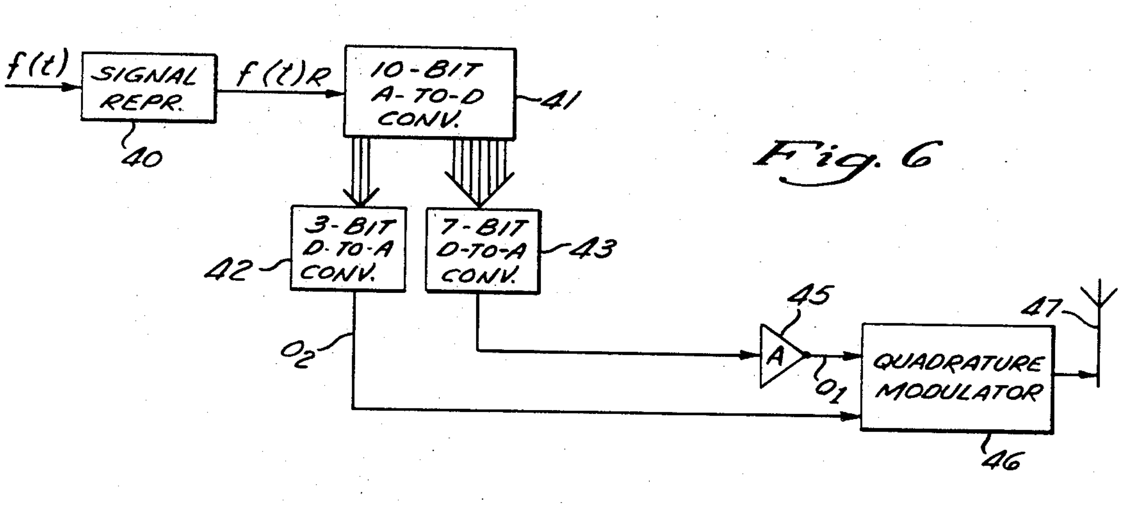
FIG. 6 is a schematic block diagram of a second embodiment of a transmitter embodying the modulation technique mapped in FIGS. 2 and 3, but with a finely quantized periodic operator.

FIG. 6 shows a modified apparatus for modulating a signal in accordance with the present invention. The continuous wave input signal, $f(t)$, is sampled by the signal representation circuit to provide the signal representation pulses, $f(t)R$, as in FIG. 4. These pulses are applied to a 10-bit analog-to-digital converter 41 of conventional design.

The most significant three stages of the A-to-D converter 41 provide the quantization of the signal representation input pulse. These 3 bits provide $2^3$ (or 8) possible output levels as the input to a 3-bit digital-to-analog converter 42, so that the output from the D-to-A converter 42 is the operator $0_2$ in FIG. 2.

The least significant seven stages of the A-to-D converter 41 provide the difference value, Δ, in FIG. 2 except that in this case Δ is not a truly continuous function. That is for each of the eight $0_2$ ranges, Δ may be at any one of $2^7$ (or 128) discrete points within that range. These points are so closely spaced that the quantization error due to their spacing is negligible. The 7-bit output of the A-to-D converter 41 is applied to a 7-bit digital-to-analog converter 43, whose output is a current substantially equal to the value of Δ, allowing for a possible slight error due to the spacing between the points which may occupy.

The output of the D-to-A converter 43 is amplified by amplifier 45 having an amplification factor of 8 ($2^3$) to provide the output pulse $O_1$, corresponding, for example, to the point Z in FIG. 2. $0_1$ is a substantially continuous function of the input signal representation, $f(t)R$, since the spacing between successive points along each $0_1$ line is so negligible as not to interrupt its substantial continuity.

The output of the 3-bit D-to-A converter 42 provides the quantizing signal, $0_2$.

These $0_1$ and $0_2$ signals are applied to a modulator 46, preferably a quadrature modulator, the output of which is applied to a transmitting antenna 47.

The modulator arrangement of FIG. 6 is essentially equivalent to that of FIG. 4, and it has the particular advantage of the widespread availability of 10-bit analog-to-digital converters of various designs, which require only slight modification to provide the two operators $0_2$ and $0_1$ in accordance with the present modulation method. It will be evident that in the modulator arrangement of FIG. 6 the A-to-D converter 41, by providing its most significant 3-bit output to one D-to-A converter 42 and its least significant 7-bit output to another D-to-A converter 43, in effect subtracts the quantized value (its 3 most significant bits) from the input signal representation, $f(t)R$, in addition to providing the quantized value itself. Therefore, the circuitry is simplified to this extent.

The receiver for use with the modulator and transmitter of FIG. 6 may be substantially the same as that shown in FIG. 5 and already described. Alternatively, in this receiver the 3-bit A-to-D converter 34 and the D-to-A converter 35 of FIG. 5 may be replaced by 1. a 10-bit A-to-D converter having the $0_2$ signal as the input to its most significant three stages and the $0_1$ signal as the input to its least significant seven stages;
2. a 3-bit D-to-A converter connected to the most significant three stages of the 10-bit A-to-D converter; and
3. a 7-bit D-to-A converter connected to the least significant seven stages of the 10-bit A-to-D converter.

The output of the 3-bit D-to-A converter would provide one input to the adder 38 in FIG. 5. The output of the 7-bit D-to-A converter would be applied to the attenuator 37 in FIG. 5 whose output provides the second input to the adder 38.

Figure 7:
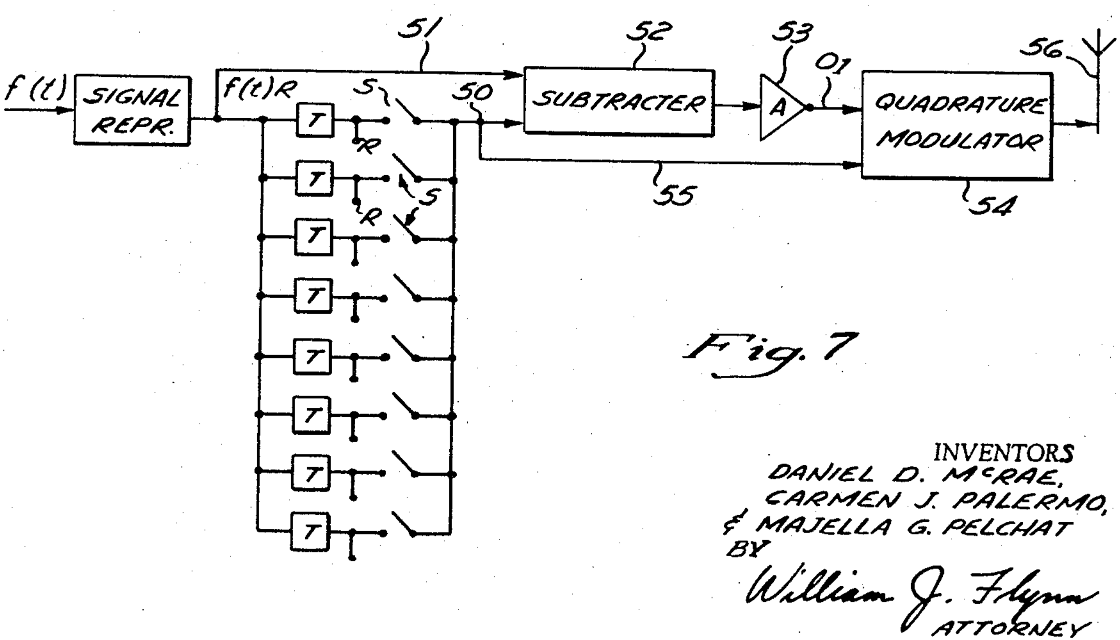
FIG. 7 is a schematic block diagram of a third embodiment of a transmitter embodying the modulation technique mapped in FIGS. 2 and 3.

FIG. 7 shows an alternative modulator arrangement in accordance with the present invention which is particularly advantageous where high-speed operation is desired.

Each signal representation pulse, $f(t)R$, is applied simultaneously to a plurality of threshold devices T, each of which closes a respective switch S when the input signal exceeds its particular threshold level, as determined by a reference current applied at point R to the opposite side of the threshold device. This parallel combination of threshold devices T, switches S and reference currents provides eight possible input levels on a line 50 leading into the subtracter 52, corresponding to the stair-step function $0_2$ in FIG. 2. That is, the threshold devices and switches quantize the input signal representation pulse, $f(t)R$, to any of eight different levels. Because the decision elements (threshold devices) are in parallel, rather than series, faster quantizing is possible with this arrangement because the entire pulse time of each pulse $f(t)$ R is available to each decision element.

The signal representation pulse, $f(t)R$, also is applied directly via line 51 to a second input to the subtracter 52. The output of the subtracter corresponds to Δ in FIG. 2 and after amplification by the amplifier 53 (which has an amplification factor of 8) it provides the $0_1$ input to the quadrature modulator 54. A second input to the quadrature modulator is the $0_2$ signal on line 55. The output of the quadrature modulator is applied to the broadcast antenna 56.

Figure 8:
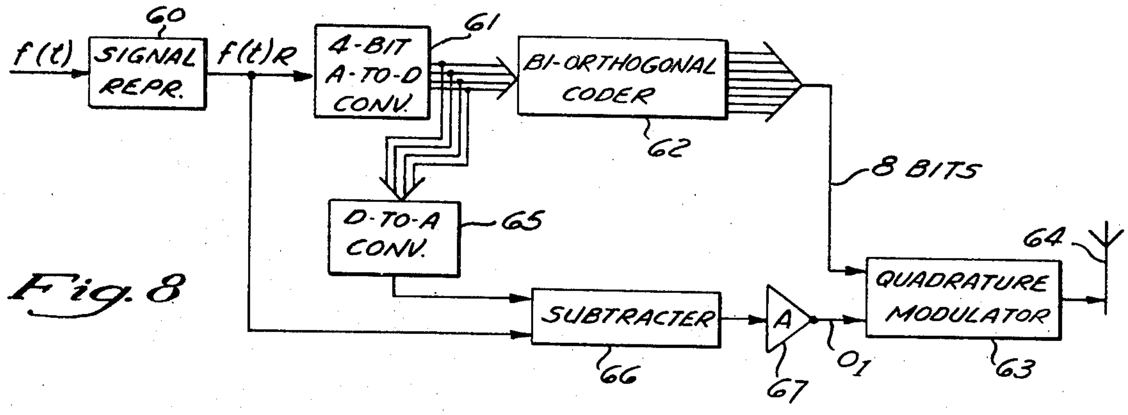
FIG. 8 is a schematic block diagram of a fourth embodiment of a transmitter embodying the modulation technique mapped in FIGS. 2 and 3 where coding of the quantized operator is used to increase dimensionality.

FIG. 8 shows an alternative modulator arrangement in accordance with the present invention where a very high signal-to-noise ratio is desired and a wider bandwidth is permissible.

The continuous wave input signal, $f(t)$, is sampled by the signal representation circuit 60 to produce signal representation pulses, $f(t)R$, which are applied to a 4-bit analog-to-digital converter 61. The output of the A-to-D converter 61 is applied to a bi-orthogonal coder 62 of known design, which converts the 4-bit input into an 8-bit output which provides an 8-bit input to a quadrature modulator 63 feeding a transmitting antenna 64.

The 4-bit output of the A-to-D converter 61 also is applied to a digital-to-analog converter 65, whose output subtracted in a subtracter 66 from the signal representation pulse, $f(t)R$, to provide a difference signal corresponding to Δ in FIG. 2. This difference signal is amplified by amplifier 67 (having an appropriate amplification factor) to provide the remainder signal $0_1$ as a second input to the quadrature modulator 63.

Thus, the modulator 63 receives as its modulating inputs an 8-bit quantizing signal from the coder 62 and a single pulse remainder signal, $0_1$, from amplifier 67.

At the receiver (FIG. 9) for the signals transmitted by the FIG. 8 apparatus, the components which correspond to those of FIG. 5 have the same reference numerals, but with an "a" suffix added, and they perform functions similar to those described with reference to the FIG. 5 receiver.

The eight-pulse quantizing signal output from the detector **32*a* is applied to an integrate and hold circuit 33*a*, whose output is applied to a decoder 68 which decodes the eight-pulse signals into 4-bit signals. These latter signals are applied to a digital-to-analog converter 35*a*, whose output provides one input to an adder 38*a***.

The remainder signal output from the detector **32*a* i applied to an integrate and hold circuit 36*a*, whose output is applied to an attenuator 37*a* having an amplification factor that is the reciprocal of that of the amplifier 67 in FIG. 8. The output of attenuator 37*a* provides a second input signal to the adder 38*a***.

The output of adder **38*a* is a substantial replica of the original signal representation pulse, $f(t)R$, in FIG. 8. The successive $f(t)R$ pulses coming out of the adder 38*a* are interpolated by an interpolator 39*a*** to produce a substantial replica of the original continuous wave input signal, $f(t)$.

Figure 9:
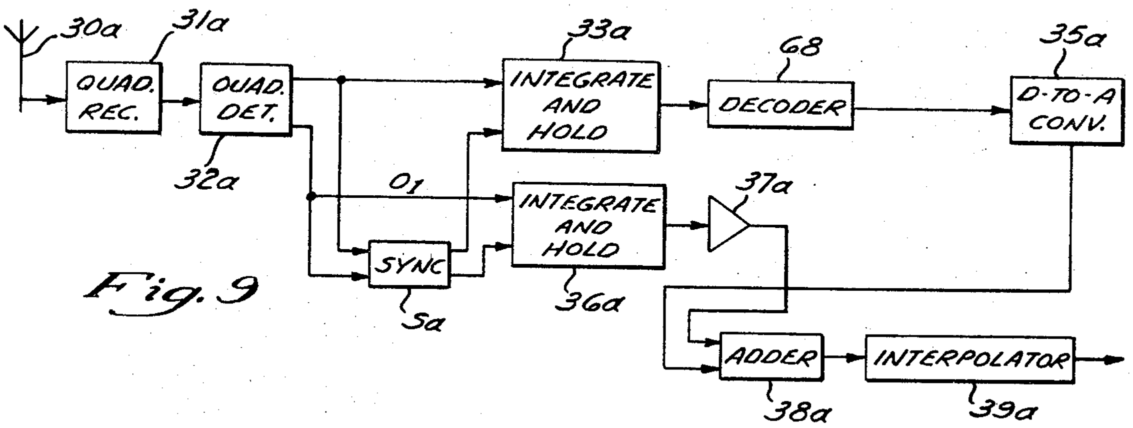
FIG. 9 is a schematic block diagram of a receiver for recovering the original signal from the signal information transmitted by the FIG. 8 transmitter.

The modulator arrangement of FIG. 8 tolerates more noise in the system without introducing error in the reproduced signal coming out of the interpolator **39*a* in FIG. 9, but it requires a wider bandwidth. Both of these characteristics are due to the relatively large number of different signal levels provided by the quantizing arrangement which includes the A-to-D converter 61 and the coder 62**. In effect, this enables greater spacing between lines and hence reduces the threshold effect so that the effects of noise are greatly attenuated.

Figures 10, 11:
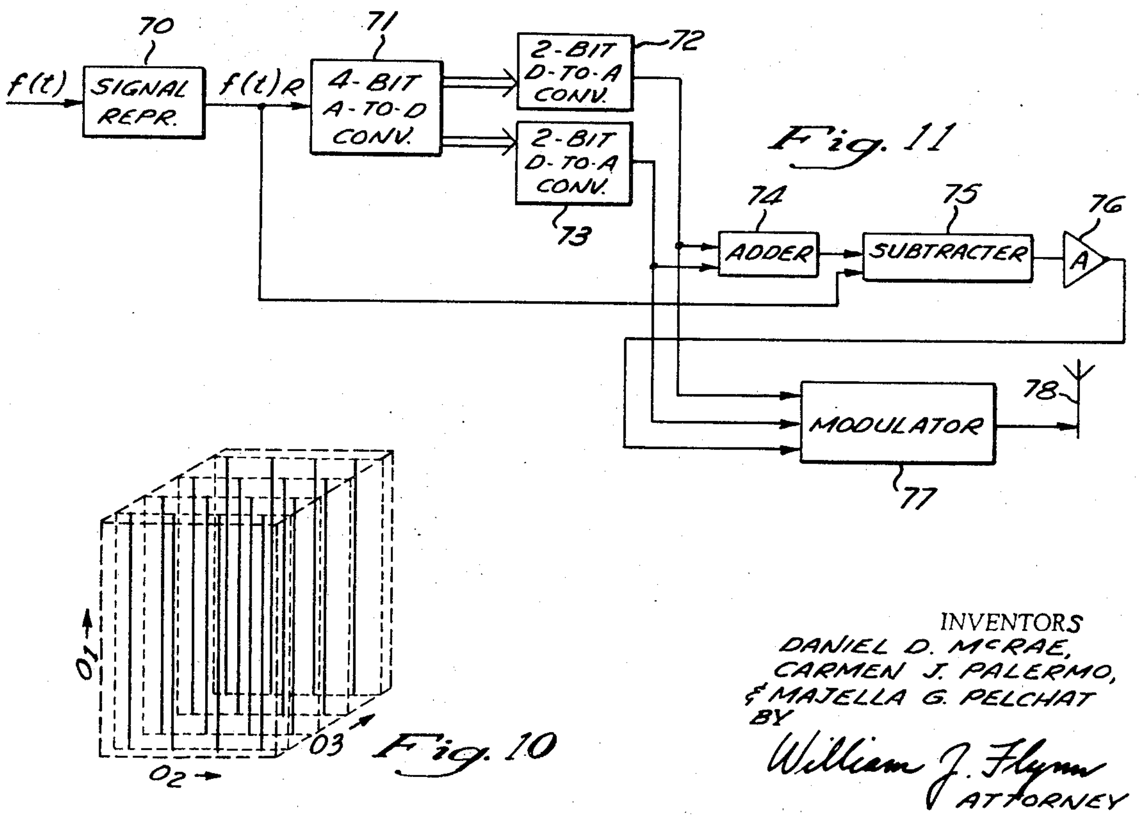
FIG. 10 is a three-dimensional map illustrating the signal-modifying functions provided by three operators in accordance with another version of the present modulation technique.
FIG. 11 is a schematic block diagram of a transmitter embodying the modulation technique mapped in FIG. 10.

The modulator arrangement of FIG. 4 may be extended to provide more than two operators. For example, FIG. 11 shows a modulator arrangement for providing three different operators, two for quantizing the signal reproduction pulses and the third for providing the remainder term $0_1$. The mapping provided by the FIG. 11 modulator is illustrated graphically in FIG. 10 as a three-dimensional map, consisting of four depth-displaced maps of the type shown in FIG. 3, except that each map in a given vertical plane of the cube has only four map lines in FIG. 10, instead of eight map lines as in FIG. 3.

The continuous wave input signal, $f(t)$, is sampled by a signal representation circuit 70 in FIG. 11 to provide signal representation pulses, $f(t)R$. Each of these pulses is applied to a 4-bit analog-to-digital converter 71. The most significant two stages of the A-to-D converter 71 are connected to a 2-bit digital-to-analog converter 73, whose output signal may be at any of four different levels. The least significant two stages of the A-to-D converter 71 are connected to a 2-bit digital-to-analog converter 73, whose output signal may be at any of four different levels. The respective outputs of the D-to-A converters 72 and 73 are applied to an adder 74, which has 16 different possible output levels, corresponding to the various combinations of its input signals from the D-to-A converters 72 and 73. Thus, the output of the adder 74 is a 16-level stair case function corresponding to the eight-level stair case function $0_2$ in FIG. 2.

The output of the adder 74 is applied as one input to a subtracter 75. A second input to the subtracter is the signal representation pulse, $f(t)R$. The difference between these two input signals to the subtracter 75 corresponds to the difference signal $\Delta$ in FIG. 2. This difference signal is amplified by amplifier 76, having an amplification factor of 16 (corresponding to the number of different map lines in FIG. 10) to provide the $O_1$ signal input to a modulator 77.

The modulator 77 receives second and third inputs from the D-to-A converters 72 and 73, respectively. The modulator may be of any suitable type, such as an amplitude modulator or a phase modulator having a suitable carrier which is amplitude-modulated or phase-modulated by the three input signals. The output of the modulator is applied to a broadcast antenna 78.

It will be evident that by providing two quantizing operators, instead of just one, the signal "stretching" factor is increased to the product of the individual stretching factors provided by the respective quantizing operators individually. This greatly enhances the signal-to-noise ratio since the remainder or signal output, $0_1$, from amplifier 76, which is the third input to the transmitter modulator 77, can be precisely located on whatever map line is identified by the two quantizing signals.

Figure 12:
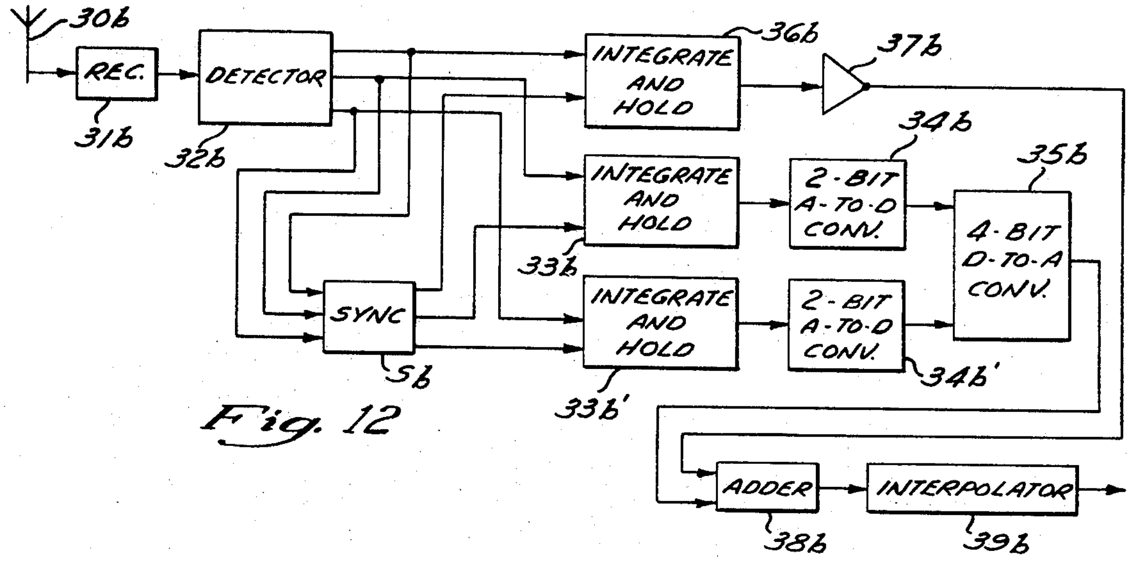
FIG. 12 is a schematic block diagram of a receiver for recovering the original signal from the signal information transmitted by the FIG. 11 transmitter.

FIG. 12 shows the arrangement for receiving the signals transmitted by the antenna 78 of FIG. 11. This receiver is essentially similar to that of FIG. 5, and corresponding components are given the same reference numerals as in FIG. 5 with a "b" suffix added. The detector 32b has three signal outputs, corresponding to the three separate signal inputs to the modulator 77 in the FIG. 11 transmitter.

One of these outputs is the $0_1$ function which provides the remainder signal. This output is applied to an integrate and hold circuit **36*b* and then is attenuated by an attenuator 37*b*, which reduces its amplitude by the reciprocal of the amplification factor in the amplifier 76 in FIG. 11. Consequently, the output from the attenuator 37*b* corresponds to the error signal $\Delta$ in FIG. 2. This signal is applied as one input to the adder 38*b***.

The other two signal outputs from the detector **32*b* are the two quantizing signals. These signals are applied to respective integrate-and-hold circuits 33*b* and 33*b'*, the outputs of which are applied to respective 2-bit A-to-D converters 34*b* and 34*b'*. The outputs of these two A-to-D converters are applied to a 4-bit D-to-A converter 35*b*, whose output may be at any of 16 different signal levels, corresponding to the 16 different map lines in FIG. 10. This quantizing analog signal output from the D-to-A converter 35*b* is applied as the second input to the adder 38b, where it is added to the remainder signal coming from the attenuator 37*b*. The output signal from the adder is a substantial replica of the signal representation pulses, $f(t)R$, which came out of the signal representation circuit 70 in FIG. 11. The interpolator 39*b* reconstitutes the original input signal, $f(t)$, from successive signal representation pulses coming out of the adder 38*b***.

It will be understood that, following the same principles, the number of operators which act on the input signal representation pulses may be extended to 4, 5, 6 or any desired number. All but one of these operators together provide the signal quantizing operation, while the remaining operator produces a signal which corresponds to the remainder to be combined with the quantized signal at the receiver.

This principle of providing more than two operators for the input signal representation pulses may be applied to the modulator arrangements shown in FIGS. 6, 7 and 8, in a manner that will be readily evident to those skilled in the art. In any such embodiment, one operator provides the remainder signal and all the other operators together providing the quantizing signals, so that by combining these signals at the receiver the input signal representation pulses can be reproduced accurately.

Figure 14:
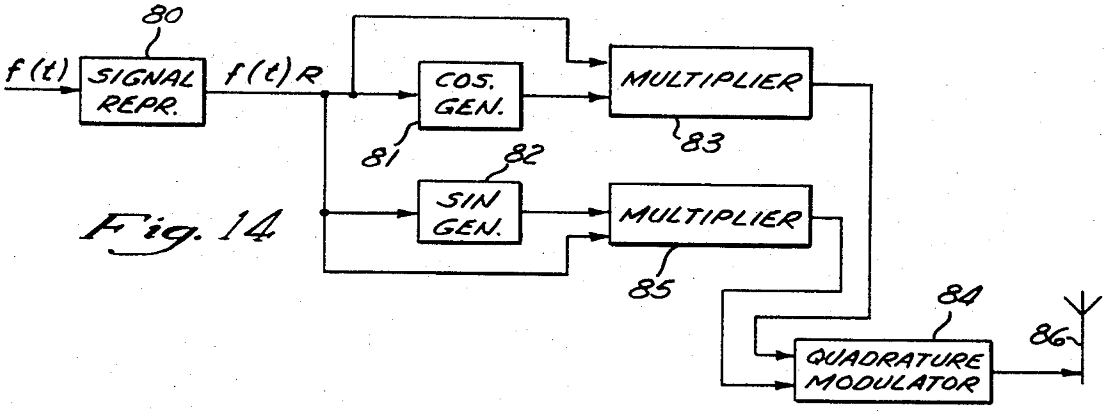
FIG. 14 is a schematic block diagram of a transmitter embodying the modulation technique mapped in FIG. 13.

A further alternative apparatus for signal modulation in accordance with the present invention is shown schematically in FIG. 14. In this apparatus the input signal representation pulses are acted upon by two operators so that the mapping or signal "stretching" follows the spiral pattern shown in FIG. 13, instead of the plurality of discrete map lines shown in FIG. 3.

The continuous wave input signal, $f(t)$, is sampled by a signal representation circuit 80 to provide input signal representation pulses, $f(t)R$, which are applied to a cosine generator 81 and to a sine generator 82. In the following discussion, the term $g$ designates the signal representation, $f(t)R$.

The output signal from the cosine generator, cos Kg, is applied as one input to a multiplier 83. The input signal representation, $g$, is applied as a second input to multiplier 83. The output signal from multiplier 83 is [$g$ cos Kg] and it is applied as one input to a modulator 84, preferably a quarature modulator.

The output signal from sine generator 82, sin Kg, is applied as one input to a multiplier 85. The input signal representation, g, is applied as a second input to multiplier 85. The output signal from multiplier 85 is [$g$ sin Kg] and it is applied as a second input to the modulator 84.

The two input signals to the modulator 84 amplitude-modulate a suitable carrier in phase quadrature relationship to each other, and this amplitude-modulated carrier is broadcast by a transmitting antenna 86.

Figures 13, 15:
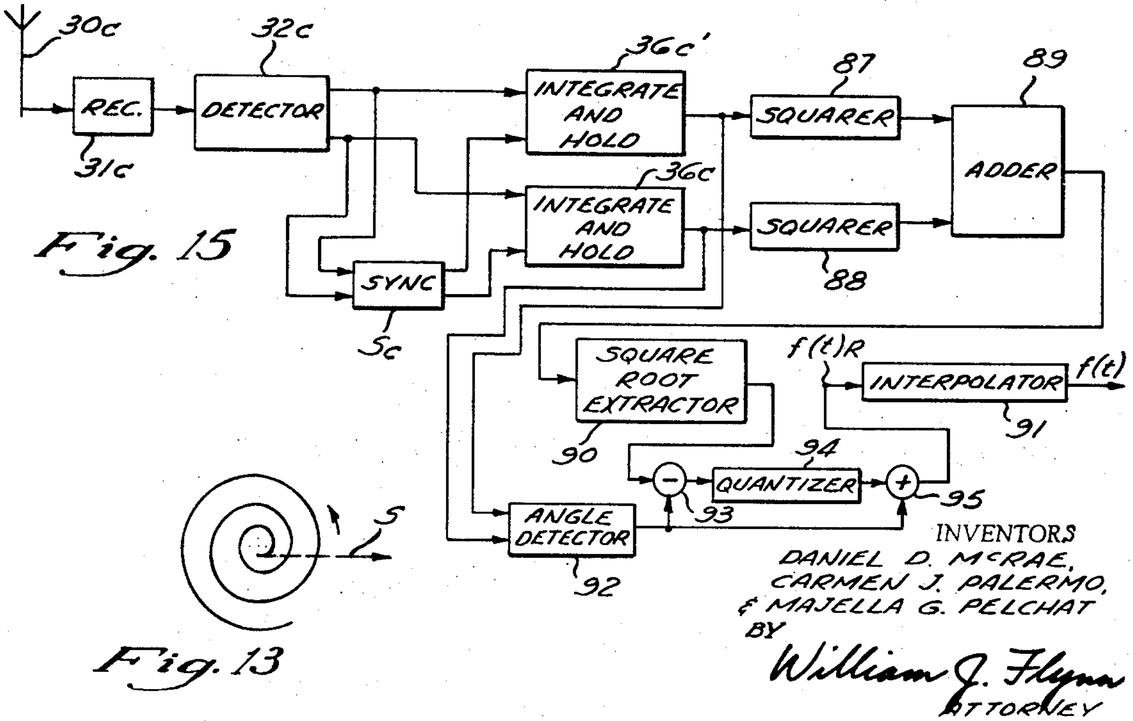
FIG. 13 is a spiral map illustrating the signal-modifying action provided by two operators in accordance with a third version of the present modulation technique.
FIG. 15 is a schematic block diagram of a receiver for recovering the original signal from the signal information transmitted by the FIG. 14 transmitter.

The outputs of the multipliers 83 and 85, when taken together, define the equations for a spiral, $x = g \cos Kg$, $y = g \sin Kg$, where the magnitude of $g$ determines the rotational angle of the locus of the spiral from an assumed starting position S in FIG. 13. K is proportional to the number of quantizing increments (i.e., the number of spiral turns for a given angle) and therefore it determines the signal "stretch" factor in this embodiment.

FIG. 15 shows a receiver and demodulator circuit for recovering the input signal, $f(t)$, from the signal transmitted by the transmitter of FIG. 14. In FIG. 15 the transmitted signals are received by an antenna 30$c$ and applied to a receiver front end 31$c$ and detector 32$c$ to recover the two modulating signals, [$g$ cos Kg] and [$g$ sin Kg.] These signals are applied through respective integrate and hold circuits 36$c$ and 36$c'$, under the control of a synchronizing circuit Sc, to respective squaring circuits 87 and 88. In addition, these signals are fed to an angle determining device 92 that determines the angle associated with the two signals modulo 2 $\pi$. The squared terms are then added together in an adder 89. Then the sum of the squared terms is applied to a circuit 90 which extracts the square root. A voltage proportional to the angle is subtracted from the square root output in a subtracter 93 and the result is passed to a quantizer 94. The voltage proportional to the angle is then added to the output of the quantizer 94 in an adder 95, producing the input signal representation pulse, $f(t)R$. The successive signal representation pulses, $f(t)R$, are applied to an interpolator 91, whose output is a substantial replica of the original continuous wave input signal, $f(t)$.

It will be evident that the spiral mapping technique illustrated in FIG. 13 may be embodied in a modulator circuit in which the input signal representation pulses are operated on by two operators corresponding respectively to range and rotational angle. In that case the range operator performs the ambiguity resolution because it designates on which turn of the spiral a particular signal representation value will fall, and the rotational angle operator gives the remainder term which tells exactly where on this particular spiral turn the particular signal representation pulse is located.

However, the circuitry of FIG. 14, which is based upon a transformation of the coordinates of range and rotational angle before the two operators are developed, is preferred for spiral mapping because of its comparative simplicity. That is, the quantizing term (range) and the remainder term (rotational angle) are not specified individually by the two operators in this embodiment, but the two operators together define what the quantizing and remainder terms are.

Figure 16:
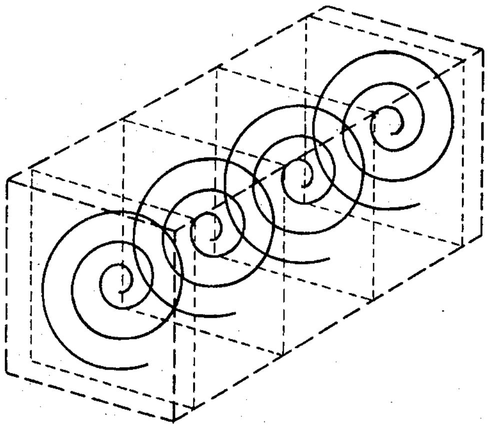
FIG. 16 is a three-dimensional map of a series of discrete spirals, illustrating the signal-modifying action provided by three operators in accordance with a fourth version of the present modulation technique.

The foregoing spiral mapping modulation technique may be extended to provide several discrete spiral maps, as indicated graphically in FIG. 16. This requires the addition of a third operator having quantizing circuitry for identifying which of the several spiral maps the signal representation value falls on.

Figure 17:
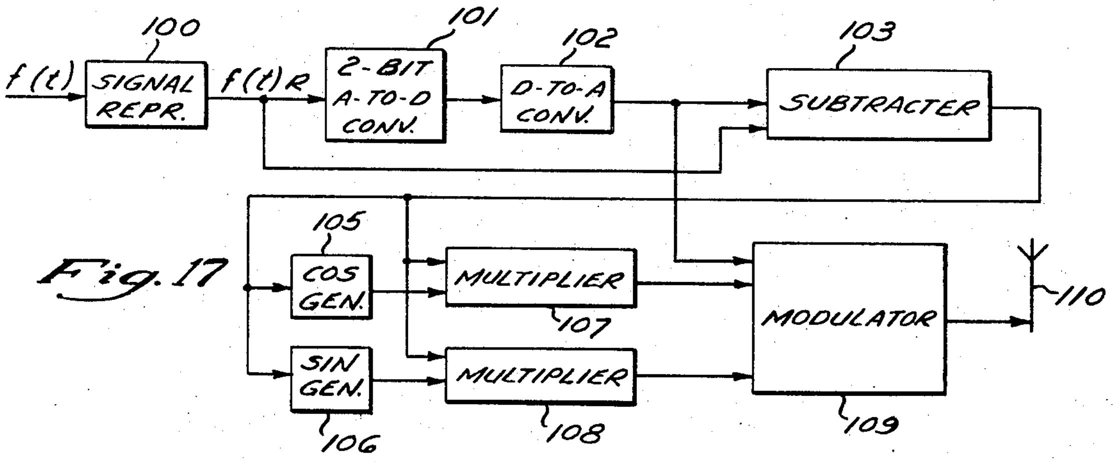
FIG. 17 is a schematic block diagram of a transmitter embodying the modulation technique mapped in FIG. 16.

As shown in FIG. 17, in such a modulator arrangement the continuous wave input signal, $f(t)$, is sampled by a signal representation circuit 100 to provide input signal representation pulses, $f(t)R$. These pulses are quantized by means of a 2-bit analog-to-digital converter 101 and a digital-to-analog converter 102. The output signal from the D-to-A converter 102 is at one of four different signal levels, each of which identifies a particular spiral map in FIG. 16. This output signal is applied as one input to a subtracter 103.

A second input to the subtracter 103 is the input signal representation pulse, $f(t)R$. The output of the subtracter 103 is the difference between these two pulses, and it represents a remainder term which defines where the signal representation pulse value falls on the particular spiral map designated by the quantizing output from the D-to-A converter 102.

The output signal from the subtracter 103 is applied to a cosine generator 105 and to a sine generator 106. The output of the cosine generator 105 is applied as one input to a multiplier 107, which has the output of the subtracter 103 as its second input. Similarly, the output of the sine generator 106 is applied as one input to a multiplier 108, which has the output of the subtracter 103 as its second input.

The outputs of the multipliers 107 and 108 are applied as separate modulating inputs to a modulator 109, which may be an amplitude modulator or a phase modulator. A third modulating input to this modulator is from the output of the D-to-A converter 102. The output of the modulator 109 is broadcast by a transmitting antenna 110.

With this arrangement the basic spiral-mapping technique embodied in the modulator of FIG. 14 is enhanced by the additional quantizing factor provided by the A-to-D converter 101 and the D-to-A converter 102 so that, in effect, several spiral maps are provided and the signal "stretching" is increased by this additional quantizing factor. Obviously, the enhancement of the signal "stretching" may be increased by a factor of eight, 16, or any other power of two, depending upon the number of binary stages in the A-to-D converter 101.

Figure 18:
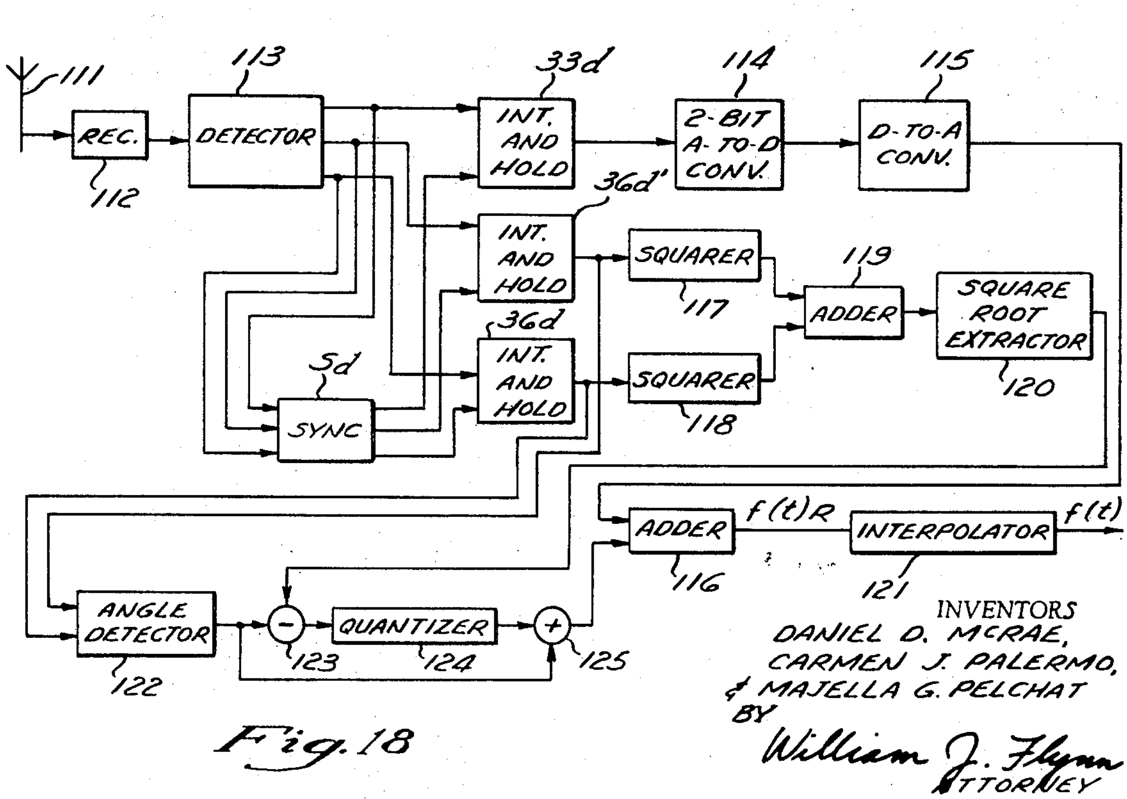
FIG. 18 is a schematic block diagram of a receiver for recovering the original signal from the signal information transmitted by the FIG. 17 transmitter.

At the receiver (FIG. 18), the signals transmitted by antenna 110 in FIG. 17 are received by an antenna 111 and passed through a receiver front end 112 and a detector 113, which recovers the three modulating signal inputs to the transmitter modulator 109 in FIG. 17.

The quantizing signal, which identifies which of the four spiral maps the input signal representation pulse was on, is applied through an integrate and hold circuit **33*d*, under the control of a synchronizing circuit Sd to a 2-bit analog-to-digital converter 114. The output of converter 114 is applied to a digital-to-analog converter 115. The output of D-to-A converter 115 is applied as one input to an adder 116**.

The respective sine and cosine modulating signals recovered by the detector 113 are applied through respective integrate and hold circuits **36*d* and 36*d'*, under the control of the synchronizing circuit Sd, to respective squarers 117 and 118 and to an angle detector 122. An adder 119 adds the outputs of the squarers 117 and 118, and the output of this adder is applied to a square root extraction circuit 120. The output of the angle detector 122 is subtracted from the output of the square root extractor 120 in a subtracter 123, and the difference is quantized by a quantizer 124. The angle detector output is added to the quantizer output in an adder 125 to recover the remainder term of the input signal representation pulse, $f(t)R$. This remainder term is applied as a second input to the adder 116, so that the output signal from adder 116 is a replica of the original input signal representation pulse, $f(t)R$. The successive $f(t)R$ pulses are passed through an interpolator 121** which interpolates them to produce a continuous wave output signal that is a substantial replica of the original continuous wave input signal, $f(t)$.

Figure 19:
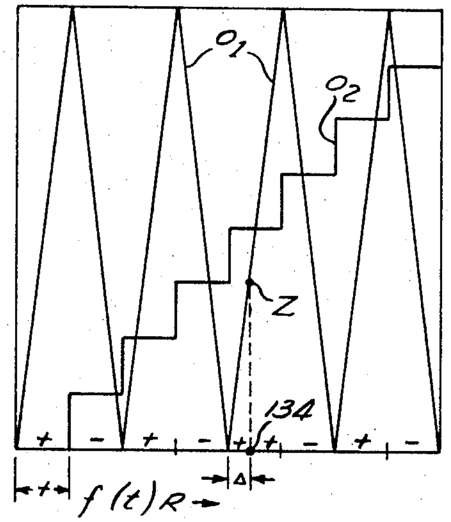
FIG. 19 is a map illustrating the signal-modifying functions provided by two operators in accordance with a fifth version of the present modulation technique.
Figure 20:
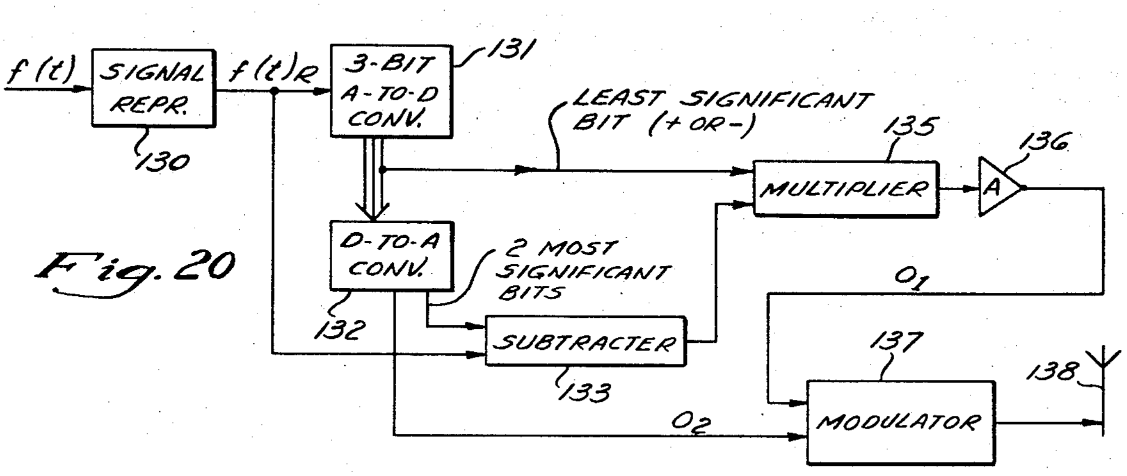
FIG. 20 is a schematic block diagram of a transmitter embodying the modulation technique mapped in FIG. 19.

FIG. 20 shows another modulator arrangement in accordance with the present invention for achieving signal "stretching" according to the mapping shown graphically in FIG. 19.

The quantizing operator $\mathbf{0_2}$ provides a stair-step function with respect to the input signal representation, $f(t)R$, which it receives. Also, the least significant digit of $\mathbf{0_2}$ may be interpreted as a + or − to indicate whether the slope of the corresponding $\mathbf{0_1}$ map line is positive or negative.

The remainder operator $\mathbf{0_1}$ provides a saw tooth function with respect to the signal input representation, $f(t)R$. Thus: when the value of $f(t)R$ is between zero and 1, the slope of $\mathbf{0_1}$ is positive; when the value of $f(t)R$ is between 1 and 2, the slope of $\mathbf{0_1}$ is negative; and so on in alternate sequence.

In FIG. 20, the continuous wave input signal, $f(t)$, is sampled by a signal representation circuit 130 which converts this continuous wave signal into a plurality of time-discrete pulses. These signal representation pulses, $f(t)R$, are applied in succession to a 3-bit analog-to-digital converter 131, whose output is connected to a digital-to-analog converter 132. The output of the D-to-A converter 132 is a signal which may have any of 8 different levels, as shown by the stair-case quantizing operator $\mathbf{0_2}$ in FIG. 19, and a signal that has four levels corresponding to the two most significant bits.

The four-level signal is applied as one input to a subtraction circuit 133. A second input to this subtraction circuit is the $f(t)R$ input signal representation pulse. The output from the subtracter 133, which is the difference between these two inputs, corresponds to the difference value Δ in FIG. 19 for an assumed value of $f(t)R$ at point 134.

The output of the subtracter 133 is applied as one input to a multiplier 135. The second input to this multiplier is either plus or minus, depending upon the least significant bit in the 3-bit output of the A-to-D converter 131. This least significant bit will be positive when the slope of the $\mathbf{0_1}$ saw-tooth operator is positive (i.e., when $\mathbf{0_2}$ is 0, 2, 4 or 6); it will be negative when the slope of $\mathbf{0_1}$ is negative (i.e., when $\mathbf{0_2}$ is 1, 3, 5 or 7).

When this least significant bit of the output from the A-to-D converter 131 provides a minus, the output Δ of the subtracter 133 will be inverted in the multiplier. Conversely, when the least significant bit of the output from the A-to-D converter 131 provides a plus, the output of the subtracter will be the same as its input, Δ.

The output of the multiplier 135 is amplified by an amplifier 136 having an amplification factor equal to the number of map lines for $\mathbf{0_1}$ (or the number of quantizing levels of $\mathbf{0_2}$), in this case, eight. Therefore, the output of the amplifier will correspond to the height above the base line of the point Z on the $\mathbf{0_1}$ curve which corresponds to the input signal representation, $f(t)R$. That is, the output of the amplifier 136 represents the remainder $\mathbf{0_1}$ in the number which designates the value of $f(t)R$. The other term of this number is the quantizing value $\mathbf{0_2}$. These two terms, $\mathbf{0_2}$ and $\mathbf{0_1}$, are applied as input signals to a modulator 137 where they modulate a suitable carrier which is then broadcast by the antenna 138. Preferably, this modulator is a phase quadrature modulator.

At the receiver (FIG. 21) for receiving the signals transmitted by antenna 138 in FIG. 20, the components of the system are arranged similar to the receiver of FIG. 5. Corresponding components of the FIG. 21 receiver are given the same reference numerals as those in FIG. 5, with a "e" suffix added, and the detailed description of the operation of these components will not be repeated.

Figure 21:
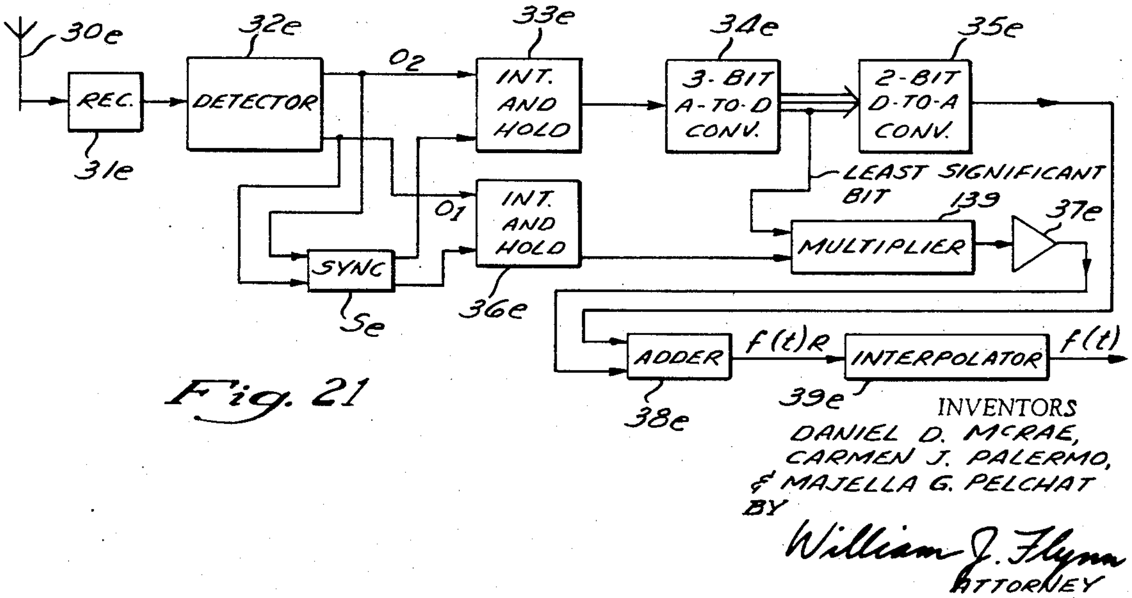
FIG. 21 is a schematic block diagram of a receiver for recovering the original signal from the signal information transmitted by the FIG. 20 transmitter.

The FIG. 21 receiver includes a multiplier 139 which has as one input the output from the integrate and hold circuit **36*e* for the $\mathbf{0_1}$ (remainder) signal. A second input to multiplier 139 is either plus or minus, depending upon the value of the least significant bit in the output from the 2-bit analog-to-digital converter 34*e*. The output of multiplier 139 is applied to an attenuation circuit 37*e*, having an amplification factor that is the reciprocal of the amplification factor of amplifier 136 in FIG. 20. In this case, the attenuator reduces the amplitude of the output signal from multiplier 139 by a factor of 8 to 1. Consequently, the output signal from attenuator 37***e* corresponds to Δ in FIG. 19.

The adder 38*e* adds this Δ signal to the output from the D-to-A converter 35*e* to produce a replica of the input signal representation pulse, *f*(t)R. The successive *f*(t)R pulses coming out of the adder 38*e* are interpolated in block 39*e* to produce a substantial replica of the original continuous wave input signal, *f*(t).

While certain presently-preferred embodiments of this invention have been disclosed with reference to the accompanying drawings, it is to be understood that the invention may be embodied in various other arrangements differing from those disclosed.

We claim:

1. Apparatus for transmitting information-bearing electrical signals over a transmission link, comprising
a transmitting station and a receiving station,
said transmitting station including
means responsive to a signal which bears information as time variations of a preselected parameter of the signal, for deriving from each of selected portions of said signal a respective first electrical value representative of said parameter, said first electrical value extracted from more than two discretely varying values each denoting a gross approximation of said parameter within an expected range of said parameter
means for further deriving from each selected portion of said signal a respective second electrical value representative of an expansion of said parameter, said second electrical value extracted from a plurality of continuously varying values denoting amplified potential deviations of said parameter from each of said gross approximations, by which the specific information content of said respective selected signal portion is determinable, and
means responsive to each of said derived first and second electrical values for impressing them on a carrier wave in a timed sequence corresponding to the timing sequence of the respective selected signal portions for transmission to said receiving station via said transmission link; and
said receiving station including
means for effectively detecting the first and second electrical values from said carrier wave in synchronization with said timed sequence and together with accompanying noise resulting from passage via said transmission link, and
means responsive to the detected first and second electrical values for a respective portion of said signal for additively combining them to reconstruct said parameter of each portion of the signal in the original sequence, while effectively reducing the detected second electrical value by an amount substantially equal to the amount of said expansion to compress said accompanying noise by a like amount.

2. The invention according to claim 1, wherein said parameter is amplitude.

3. The invention according to claim 2, wherein
said first means for deriving includes means for quantizing each selected signal portion at a level of an *m*-ary code grossly representative of the amplitude of the respective signal portion, where *m* is an integer greater than 2.

4. The invention according to claim 3, wherein
said means for further deriving includes means for calculating the difference between the actual amplitude and the quantized level of the respective signal portion, and means for generating an amplified version of the difference as the respective second electrical value.

5. Apparatus for transmitting information-bearing electrical signals, comprising
means responsive to a signal which bears information as time variations of a preselected parameter of the signal, for deriving from each of selected portions of said signal a respective first electrical value representative of said parameter, said first electrical value extracted from more than two discretely varying values each denoting a gross approximation of said parameter within an expected range of said parameter,
means for further deriving from each selected portion of said signal a respective second electrical value representative of an expansion of said parameter, said second electrical value extracted from a plurality of continuously varying values denoting amplified potential deviations of said parameter from each of said gross approximations, by which the specific information content of said respective selected signal portion is determinable, and
means responsive to each of said derived first and second electrical values for impressing them on a carrier wave in a timed sequence corresponding to the timing sequence of the respective selected signal portions for transmission to a remote receiving station via said transmission link.

6. The invention according to claim 5, wherein said parameter is amplitude.

7. The invention according to claim 6, wherein
said first means for deriving includes means for quantizing each selected signal portion at a level of an *m*-ary code grossly representative of the amplitude of the respective signal portion, where *m* is an integer greater than 2.

8. The invention according to claim 7, wherein
said means for further deriving includes means for calculating the difference between the actual amplitude and the quantized level of the respective signal portion, and means for generating an amplified version of the difference as the respective second electrical value.

9. A signalling system, comprising
means responsive to an electrical input signal for sampling the amplitude thereof at timed intervals,
means responsive to the amplitude samples for respective quantization thereof at representative ones of a finite number of potential levels greater than two,
means responsive to each amplitude sample and to its respective quantization level for generating that one of an infinite number of potential levels representative of the actual difference between the amplitude sample and its quantization level, means responsive to each generated difference level for amplification thereof.

means responsive to said quantization levels and said amplified difference levels for modulation of a carrier therewith in accordance with said timed sequence for transmission to a remote receiving terminal, and, at the receiving terminal, means responsive to the modulated carrier for detecting said quantization levels and said amplified difference levels in said timed sequence therefrom, together with accompanying noise resulting from said transmission, and means for compressing said amplified difference level in an inverse ratio to the original amplification thereof to compress said accompanying noise in a like ratio, and means responsive to each quantization level and respective difference level for combining them in said timed sequence to develop a replica of the sequence of amplitude samples for said original input signal.

10. A transmitter, comprising means for discrete time sampling of an input wave, means responsive to the samples of the input wave for effectively stretching each sample to generate a first signal ambiguously representative of the information content of the respective sample as a magnified deviation from an unknown one of a set of discretely increasing reference levels greater in number than two, means further responsive to the samples of the input wave for selecting a representative one of said levels for each sample and for generating as that level a second signal to resolve the ambiguity associated with the respective first signal, and means responsive to the first and second signals associated with each sample for impressing those signals on a third signal in the timing of the original respective samples, whereby to allow compression of said magnified deviation at a receiving station for said third signal upon resolution of the ambiguity of said first signal by said second signal and thereby compress the amount of accompanying noise.

11. An information transmission system, comprising means for selectively converting the information-bearing parameter of an information signal into first and second modulation signals, said means including means for expanding said parameter from its original value at a selected segment of said information signal to a new value in a predetermined ratio of expansion, as an enlarged deviation from any of a plurality of distinct and different reference values, and means for assigning to said parameter at said selected segment of the information signal a representative one of said reference values from which said deviation is to be measured;

means for applying said first and second modulation signals representative of said enlarged deviation and said representative reference value, respectively, for a plurality of temporally spaced selected segments of said information signal, to a carrier signal; and means for transmitting said carrier signal with said first and second modulation signals impressed thereon to a receiving station.

12. The receiving station for the information transmission system according to claim 11 said receiving station comprising means for detecting said first and second modulation signals from said carrier signal, and means for recovering the original information signal from said detected first and second modulation signals, said recovering means including means responsive to said detected second modulation signal for selecting as the representative reference value associated therewith that one of said plurality of reference values closest to the value of the second modulation signal as detected, means responsive to said detected first modulation signal for reducing the value thereof by a ratio inversely corresponding to said ratio of expansion to reduce noise accompanying said detected first modulation signal by approximately the same ratio, and means for additively combining the selected reference value associated with said detected second modulation signal and the reduced value associated with said detected first signal for each respective selected segment in accordance with the temporal spacing thereof to reconstruct the original information signal.

* * * * *